US011046308B2

(12) United States Patent
Hehn et al.

(10) Patent No.: US 11,046,308 B2
(45) Date of Patent: Jun. 29, 2021

(54) METHOD FOR COLLISION AVOIDANCE BETWEEN A VULNERABLE ROAD USER TRANSPORTATION VEHICLE AND A SURROUNDING TRANSPORTATION VEHICLE, VULNERABLE ROAD USER TRANSPORTATION VEHICLE, FURTHER TRANSPORTATION VEHICLE, AND COMPUTER PROGRAM (71) Applicant: VOLKSWAGEN AKTIENGESELLSCHAFT, Wolfsburg (DE)

(72) Inventors: Thorsten Hehn, Etting (DE); Marcel Günther Penz, Berlin (DE); Tobias Ludwig, Cremlingen (DE)

(73) Assignee: Volkswagen Aktiengesellschaft (*) Notice: Subject to any disclaimer, the term of this patent is extended or adjusted under 35 U.S.C. 154(b) by 211 days.

(21) Appl. No.: 16/153,864

(22) Filed: Oct. 8, 2018

(65) Prior Publication Data
US 2019/0111921 A1 Apr. 18, 2019

(30) Foreign Application Priority Data

Oct. 16, 2017 (EP) .................................. 17196570

(51) Int. Cl.
G01C 21/06 (2006.01)
G08G 1/16 (2006.01)
(Continued)

(52) U.S. Cl.
CPC ........ B60W 30/0953 (2013.01); B60W 30/09 (2013.01); B60W 50/14 (2013.01);
(Continued)

(58) Field of Classification Search
CPC ........... B62J 27/00; G08G 1/16; G08G 1/166; G08G 1/167; G08G 1/161; G08G 1/163;
(Continued)

(56) References Cited

U.S. PATENT DOCUMENTS 7,932,820 B2 * 4/2011 Hurwitz ............... A42B 3/0453
340/432
9,711,050 B2 * 7/2017 Ansari ................... G06Q 40/08
(Continued)

FOREIGN PATENT DOCUMENTS

DE 10245796 A1 4/2004
DE 10334203 A1 3/2005
(Continued)

OTHER PUBLICATIONS

GNSS Location Verification in Connected and Autonomous Vehicles Using in-Vehicle Multimodal Sensor Data Fusion Nicolas Souli et al; 2020 22nd International Conference on Transparent Optical Networks (ICTON): IEEE Conference Paper (Year: 2020).*
(Continued)

Primary Examiner — Cuong H Nguyen
(74) Attorney, Agent, or Firm — Barnes & Thornburg LLP (57) ABSTRACT A method for collision avoidance between a vulnerable road user transportation vehicle and a surrounding transportation vehicle. The user of the vulnerable road user transportation vehicle makes use of a portable communication device. Since such vulnerable road users are often involved in accidents since they are not easily recognized in the traffic, the disclosure increases safety for these vulnerable road users. The method includes transferring position detecting sensor data or derived position data of the vulnerable road user transportation vehicle to the portable communication device which performs a map matching technique for refin-
(Continued)

ing the position data and transfers the refined position data to the vulnerable road user transportation vehicle. The vulnerable road user transportation vehicle distributes the refined position data to the surrounding transportation vehicles which calculate a trajectory for the vulnerable road user transportation vehicle and estimate the risk of a collision.

13 Claims, 3 Drawing Sheets

(51) Int. Cl.
*B60W 30/095* (2012.01)
*G01C 21/30* (2006.01)
*H04W 4/40* (2018.01)
*B60W 30/09* (2012.01)
*B60W 50/14* (2020.01)
*G01S 5/00* (2006.01)

(52) U.S. Cl.
CPC .......... *G01C 21/30* (2013.01); *G01S 5/0072* (2013.01); *G08G 1/161* (2013.01); *G08G 1/163* (2013.01); *G08G 1/166* (2013.01); *H04W 4/40* (2018.02); *B60W 2050/143* (2013.01)

(58) Field of Classification Search
CPC ..... B60R 21/013; G07C 5/008; A42B 3/0433; A42B 3/046; B60W 30/09; B60W 50/14; B60W 2050/143; H04W 4/46
USPC ............... 701/301; 340/901–903, 425.5, 427
See application file for complete search history.

(56) References Cited

U.S. PATENT DOCUMENTS

| | | | |
|---|---|---|---|
| 10,037,689 B2* | 7/2018 | Taylor | G08G 1/096775 |
| 10,096,244 B2* | 10/2018 | Ho | G01S 19/14 |
| 10,303,166 B2* | 5/2019 | Iagnemma | B60W 30/18163 |
| 10,325,491 B1* | 6/2019 | Fields | H04W 4/46 |
| 10,455,882 B2* | 10/2019 | Strickland | G08G 1/166 |
| 10,464,515 B2* | 11/2019 | Lin | B62J 27/00 |
| 10,748,419 B1* | 8/2020 | Fields | G07C 5/008 |
| 10,769,954 B1* | 9/2020 | Fields | G08G 1/096758 |
| 10,977,945 B1* | 4/2021 | Fields | G08G 1/166 |
| 2015/0199547 A1* | 7/2015 | Fraccaroli | F41A 17/063 340/10.1 |
| 2015/0316385 A1 | 11/2015 | Serbanescu | |
| 2016/0086489 A1* | 3/2016 | Aich | G08G 1/163 340/903 |
| 2016/0353241 A1 | 12/2016 | Venkataramani et al. | |
| 2016/0357187 A1* | 12/2016 | Ansari | G01S 13/862 |
| 2016/0357262 A1* | 12/2016 | Ansari | G06Q 10/0833 |
| 2016/0358477 A1* | 12/2016 | Ansari | G06Q 30/0251 |
| 2016/0379486 A1* | 12/2016 | Taylor | G08G 1/096844 340/905 |
| 2017/0074659 A1* | 3/2017 | Giurgiu | G01S 19/07 |
| 2017/0287335 A1* | 10/2017 | Ansari | B60W 40/04 |
| 2018/0364708 A1* | 12/2018 | Losh | B60K 28/06 |
| 2019/0285726 A1* | 9/2019 | Muto | G08G 1/16 |

FOREIGN PATENT DOCUMENTS

| | | |
|---|---|---|
| DE | 102008012655 A1 | 12/2008 |
| DE | 102017108130 A1 | 10/2018 |
| WO | 2012129425 A2 | 9/2012 |

OTHER PUBLICATIONS

Vehicle Distance Warning on the Highway Based on Smart Phone Platform's Data Fusion; Xu Jing; et al; 2015 8th International Conference on Intelligent Computation Technology and Automation (ICICTA); IEEE Conference Paper. (Year: 2015).*
Localized data fusion model for VANETs using GPS and non-GPS system; Muhammad Tufail Hashmi et al; 2017 International Conference on Communication Technologies (ComTech); IEEE Conference Paper. (Year: 2017).*
Cooperative Multi-sensor Multi-vehicle Localization in Vehicular Adhoc Networks; Sepideh Afkhami Goli et al; 2015 IEEE International Conference on Information Reuse and Integration; IEEE Conference Paper. (Year: 2015).*
Cooperative Raw Sensor Data Fusion for Ground Truth Generation in Autonomous Driving; Egon Ye;Philip Spiegel;Matthias Althoff; 2020 IEEE 23rd International Conference on Intelligent Transportation Systems (ITSC); Year: 2020; IEEE Conference Paper (Year: 2020).*
IF-Matching: Towards Accurate Map-Matching with Information Fusion; Gang Hu;Jie Shao;Fenglin Liu;Yuan Wangj;Heng Tao Shen; IEEE Transactions on Knowledge and Data Engineering; Year: 2017; vol. 29, Issue: 1; IEEE Journal Article. (Year: 2017).*
Joint-Sparse Decentralized Heterogeneous Data Fusion for Target Estimation; Ruixin Niu;Peter Zulch;Marcello Distasio; Genshe Chen;Dan Shen;Zhonghai Wang;Jingyang Lu; 2019 IEEE Aerospace Conference;Year: 2019; IEEE Conference Paper. (Year: 2019).*
Map Matching and Lane Detection Based on Markovian Behavior, GIS, and IMU Data; Jens Trogh; Dick Botteldooren; Bert De Coensel; Luc Martens; Wout Joseph; David Piets; IEEE Transactions on Intelligent Transportation Systems; Year: 2020; IEEE Early Access Article. (Year: 2020).*
ETSI TS 136 213; LTE; Evolved Universal Terrestrial Radio Access (E-UTRA); Physical layer procedures; 3GPP TS 36.213; Version 13.0.0, Release 13; May 2016.
Search Report for European Patent Application No. 17196570.0; dated Apr. 30, 2018.

* cited by examiner

METHOD FOR COLLISION AVOIDANCE BETWEEN A VULNERABLE ROAD USER TRANSPORTATION VEHICLE AND A SURROUNDING TRANSPORTATION VEHICLE, VULNERABLE ROAD USER TRANSPORTATION VEHICLE, FURTHER TRANSPORTATION VEHICLE, AND COMPUTER PROGRAM

PRIORITY CLAIM

This patent application claims priority to European Patent Application No. 17196570.0, filed 16 Oct. 2017, the disclosure of which is incorporated herein by reference in its entirety.

SUMMARY

Illustrative embodiments relate to a method for collision avoidance between a vulnerable road user transportation vehicle and a transportation vehicle in the vicinity. Illustrative embodiments further relate to a corresponding vulnerable road user transportation vehicle, a corresponding further transportation vehicle as well as a corresponding computer program.

BRIEF DESCRIPTION OF THE DRAWINGS

An exemplary embodiment is illustrated in the drawings and is explained in more detail below with reference to the figures, in which.

DETAILED DESCRIPTION

In cities, there is a high risk of accidents involving cyclists. Accidents are usually caused by incorrect behavior on the part of cyclists, but also by other road users. Frequently, accidents occur in the case of incorrect or prohibited use of the road, errors in moving into the flow traffic, unadjusted speed, or incorrect behavior during turning.

The subject application therefore is concerned with an important property of a safety package for vulnerable road user transportation vehicles, e.g., bicycles. According to this concept radio messages will be sent about the position, speed, direction and other parameters such as bicycle size, lean angle, acceleration of a cyclist to the local road users in the vicinity. These messages are processed by appropriately equipped surrounding transportation vehicles and, in the event of a danger, lead to the driver being warned or the launch of an autonomous collision avoidance maneuver when autonomous driving technology is involved. These kinds of systems are already known in the automotive sector.

From DE 102 45 796 A1 a method of determining the current locomotion mode of a road user who is making use of a mobile telephone is known. Such method involves, that the place of the road user is successively determined on the basis of successive radiolocation instants. A vector chain of the locations as well as a vector sequence of the velocities of the mobile telephone is determined. Thereby a link of a respective place of the road user with a digital Road map, a so-called "map matching technique" is used to determine the way of locomotion of the road user.

From DE 103 34 203 A1 a method for organizing traffic on the road is known which aims at minimizing road accidents. The position of vulnerable road users, particularly pedestrians or two-wheelers can be determined by the mobile phones of such road users. Core of the process according to the disclosure is that at least within an adjustable range, two traffic users moving in this range engage automatically in a direct intercommunication and inform each other about their locomotion. Through the direct and, above all, situation-based automatic intercommunication of the road users is the intermediate involvement of a control center to clear the situation superfluous. Valuable time is saved and automatic warnings as well as possible automatic interventions will be so promptly triggered, that causing an accident can be safely prevented.

From DE 10 2008 012 655 A1 an apparatus for determining the relative position between a first and a second transportation vehicle is known. For determining a relative position between two transportation vehicles the position data of the adjacent transportation vehicles with certain metadata will be transferred to the other transportation vehicle. The transmission occurs, for example, by direct vehicle-to-vehicle communication or by way of a detour via a central station. The metadata can be used to make a selection of the available satellites for the position determination in the other transportation vehicle. In this way, it is possible to minimize the systematic errors resulting from a different selection of the satellites in the two transportation vehicles for the position determination with GPS signals as a result. In the inner city area, where the satellite signals are not always readily receivable, the signals from a direction sensor, distance sensor and steering wheel angle sensor for the position determination can also be evaluated.

In view of the prior art mentioned above, there is still a problem that the position determination, which is solely based on satellite navigation is not precise enough for the purpose of a collision avoidance in connection with vulnerable road user transportation vehicles. E.g., the precision of the position determined with GPS signals is announced to be ±7.5 m.

Disclosed embodiments improve the position determination method to increase safety for vulnerable road users.

Disclosed embodiments provide a method for collision avoidance between a vulnerable road user transportation vehicle and a surrounding transportation vehicle, a vulnerable road user transportation vehicle a transportation vehicle, and a computer program.

The solution is based on an adaptation of the vulnerable road user transportation vehicle on one hand and, in particular, the exact localization of the vulnerable road user transportation vehicle through the interaction between VRU vehicle and the portable device of the VRU user, such as smartphone or tablet.

The solution works independently of the technology used for direct V2V or D2D communication (WLAN 802.11p, LTE-V, 5G).

First of all, it is mentioned that the vulnerable road user transportation vehicle will be equipped with at least one odometer sensor supporting an independent position determination apart from the global navigation satellite system GNSS, such as Global Positioning System GPS, Globalnaja nawigazionnaj a sputnikowaj a sistema GLONASS, Galileo or Beidou. Moreover, the determination of the high precision position is done by interaction between VRU vehicle and portable user equipment. This interaction comprises an operation of transferring position detecting sensor data to the portable communication device. A wireless communication technology could be used for this data transfer, such as BLUETOOTH® or ZIGBEE® communication. In the portable communication device then there is executed an operation of evaluating the received position detecting sensor data and deriving position data therefrom for the vulnerable road user transportation vehicle. For the position detecting sensor data as odometer sensor data, an operation of performing a map matching technique is performed for refining the position data. It follows an operation of transferring the refined position data to the vulnerable road user transportation vehicle and in the vulnerable road user transportation vehicle an operation of distributing the refined position data to the surrounding transportation vehicles. The surrounding transportation vehicles can hence make use of the received position data to estimate a trajectory for the VRU vehicle, determine the risk of a collision and finally take an action to avoid a collision. This solution has several important benefits. Normally, a VRU makes use of a portable communication device such as smart phone or tablet. These portable communication devices typically are equipped with GPS module and offer the feature of satellite navigation. It also has enough CPU power to execute evolved algorithms. On the other hand the VRU vehicle is better suited for participating in direct D2D or V2V communication. E.g., it is bigger in size than the portable communication device and can be equipped with multiple antennas at different places. The places for mounting the antennas can have better direct sight to the satellites of the satellite navigation system and also to other road participants. Also it is equipped with a high capacity battery and hence can deliver enough power for a prolonged direct D2D or V2V communication phase.

An alternative solution which is also regarded as an exemplary embodiment is that not the bare position detection sensor data is transferred to the portable device but the completed position data which is derived from the position detection sensor data. In this case there is no need for performing the operations of evaluating the position detection sensor data and deriving the position data in the portable device.

Another beneficial measure is if the vulnerable road user transportation vehicle is equipped with at least two different position detection sensors and in the portable communication device an operation of performing a data fusion algorithm with the position data derived from the received different position detecting sensors is performed. Both help subjectively to improve the precision of the position determination.

For improving safety of the user of the VRU vehicle, a surrounding transportation vehicle performs an operation of calculating a trajectory for the vulnerable road user transportation vehicle based on the position data received in the distribution operation, determining the risk of a collision and if the risk of a collision exceeds a certain level, performing a collision avoidance maneuver and/or outputting a warning message to the driver of the surrounding transportation vehicle. Such algorithms need to be installed in the transportation vehicle anyhow if cooperative driving and/or autonomous driving shall be supported. Making autonomous collision avoidance maneuvers with the VRU vehicle is more difficult since the user is not at all protected.

For the communication between VRU vehicle and portable communication device for the operation of transferring the position detecting sensor data it is beneficial that it is performed by a short range wireless communication technique, such as BLUETOOTH® or ZIGBEE®. These communication systems are standardized and are readily available on the market and can be implemented without causing high costs. The user just needs to associate his portable communication device with the VRU vehicle before starting a route. This can be done automatically when a pairing has been established before.

For a vulnerable road user transportation vehicle, such as bicycle, motorcycle, scooter, wheel chair, or roller, it is beneficial if it comprises at least two different position detecting sensors, a communication module and an antenna module.

It is further of benefit if the antenna module comprises at least two antennas for applying an antenna diversity technique such as MISO corresponding to multiple input single output, SIMO corresponding single input multiple output or MIMO corresponding to multiple input multiple output processing. When used in combination with diversity schemes, this improves the robustness of the communication against interferences.

Also beneficial for improving the exactness of the position determination is if the at least two position detection sensors comprise at least two of the sensors a wheel tick sensor, an inertial measurement unit, and an absolute positioning system module such as GPS, GLONASS, Galileo or Beidou.

Here, it is further beneficial that the communication module is capable to perform vehicle-to-vehicle communication V2V or device-to-device communication D2D according to one of the systems WLAN 802.11p corresponding to wireless LAN, LTE-V corresponding to Long Term Evolution-vehicle or 5G D2D corresponding to the 5. Generation mobile communication technology. These technologies are also specified and can be implemented without subjective research and development work.

The proposal also concerns, a corresponding transportation vehicle which is adapted to perform the operations of the surrounding transportation vehicle in the method according to one of the claims 1 to 4.

For a corresponding computer program it is beneficial that, the computer program comprises program operations, which when run in a computer carry out the operations of, evaluating the received position detecting sensor data and deriving position data for the vulnerable road user transportation vehicle, performing a map matching technique for refining the position data, and transferring the refined position data to the vulnerable road user transportation vehicle, which finally informs the other transportation vehicles in the vicinity. This computer program may be implemented as an app which could be installed on the portable device of the vulnerable road user, such as smart phone or tablet computer as mentioned before.

It is further beneficial if the computer program further comprises program operations, which when run in a computer carry out an operation of performing a data fusion algorithm with the position data derived from the different position detecting sensors. Such data fusion algorithm causes a high demand of computing time such that this type of calculation is better executed on the portable communication device which if it comes as a smartphone or tablet is equipped with a powerful central processing unit CPU.

In this case, the absolute position data indicate the measured position of the transportation vehicle at a certain time in absolute values, for example, in a UTM or WGS84 reference coordinate system. Optionally, the absolute position data may also be provided with an orientation, e.g., a current direction of movement of the transportation vehicle. A combination of position and orientation is often referred to as a pose. The position is usually expressed two-dimensionally in a Cartesian coordinate system.

The odometry position data, on the other hand, indicate a self-movement or relative movement of the transportation vehicle, for example, in an arbitrarily defined reference coordinate system or in the so-called transportation vehicle coordinate system ("body frame"). In this case, the self-movement, is indicated in each case relative to a preceding position of the transportation vehicle.

Corresponding benefits are apparent for a vulnerable road user transportation vehicle and a further transportation vehicle according to the proposal and a computer program according to the proposal as claimed.

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles and concepts of the disclosure to furthering the art, and are to be construed as being without limitation to such specifically recited examples and conditions.

Moreover, all statements herein reciting principles, properties, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a method or mechanism for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited methods or mechanisms are combined and brought together in the manner which the claims call for. It is thus regarded that any method or mechanism that can provide those functionalities are equivalent to those shown herein.

Figure 1:
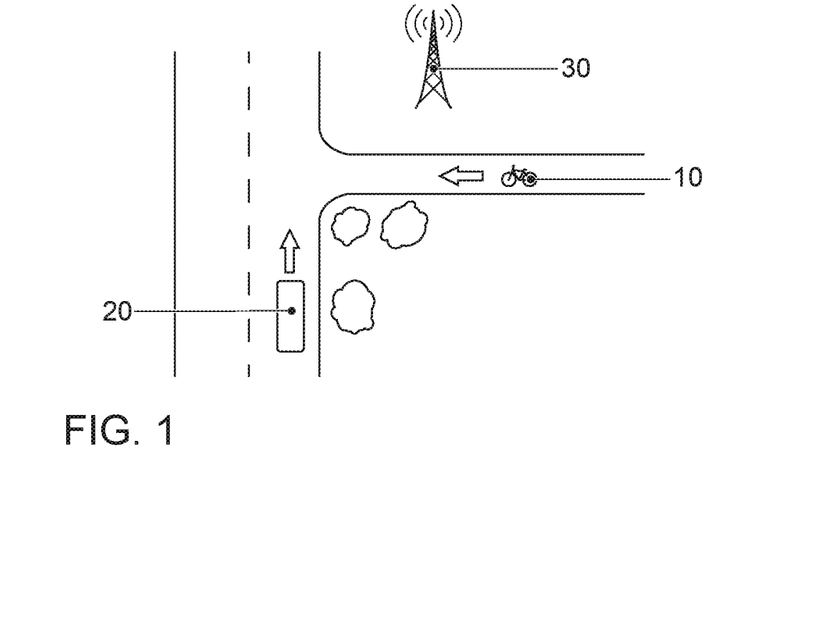
FIG. 1 illustrates a typical traffic situation where a vulnerable road user transportation vehicle crosses the path of a surrounding bigger transportation vehicle.

FIG. 1 shows a typical traffic situation where a vulnerable road user transportation vehicle is involved. The vulnerable road user transportation vehicle is exemplified as a bicycle and labelled with reference number 10. A bicycle is only one example of a vulnerable road user transportation vehicle. Other examples are a motorcycle, a scooter, a wheel chair, or a roller. The listing is not exhaustive and there exist further operations, e.g., a Segway Personal Transporter, or a Self-Balancing Unicycle and more.

Another transportation vehicle is labeled with reference number 20. That transportation vehicle is a bigger size transportation vehicle with 3, 4 or more wheels. The term transportation vehicle is to be understood as a collective term for transportation vehicles with an internal combustion engine or an electric motor. Whether for, passenger cars, trucks, buses, agricultural transportation vehicles or construction machines. The list is not exhaustive and includes other transportation vehicle categories.

For these types of transportation vehicles there exist a plurality of communication techniques. Transportation vehicles participate in mobile communication since long, and now with cooperative or autonomous driving technologies arising there is also a focus on transportation vehicle direct communication, which is necessary for this purpose. Various systems for transportation vehicle communication are developed. Examples include WLAN-based transportation vehicle communication, also called "ad-hoc domain", and transportation vehicle communication in the field of mobile radio networks. In the case of mobile radio-based technology, however, the base station has to transmit the messages from transportation vehicle to transportation vehicle. This is the area where communication takes place in the so-called "Infrastructure Domain" For the future mobile radio generation, the transportation vehicle direct communication is also made possible. In LTE, according to Long Term Evolution, this option is called LTE-V corresponding to LTE vehicle, and in the case of the 5G initiative this option is often called D2D for device two device communication.

Such transportation vehicles 20 are equipped with a communication module, which serves as a transmitting and receiving unit for communication in a mobile radio network. All messages from the transportation vehicle 20 (uplink) and to the transportation vehicle 20 (downlink) are routed either via a base station 30 which serves a mobile radio cell or, in the case of direct transportation vehicle communication (Sidelink), directly between a plurality of the transportation vehicles 20. If the transportation vehicles 20 are within this mobile radio cell, they are registered or logged in at the base station 30. If they leave the mobile cell, they are handed over to the neighboring cell (handover) and accordingly logged out or logged off at the base station 30. The base station 30 also provides access to the Internet so that the transportation vehicles 20 or all other mobile radio subscribers are supplied with Internet data in the mobile radio cell.

Such mobile radio technologies are standardized and reference is made here to the corresponding specifications of mobile radio standards. As a modern example of a mobile radio standard, reference is made to the 3GPP initiative and the LTE standard (Long Term Evolution). Many of the related ETSI specifications are currently available in the version 14. The following is mentioned as an example: ETSI TS 136 213 V13.0.0 (2016-05); Evolved Universal Terrestrial Radio Access (E-UTRA); Physical layer procedures (3GPP TS 36.213 version 13.0.0 Release 13).

Figure 2:
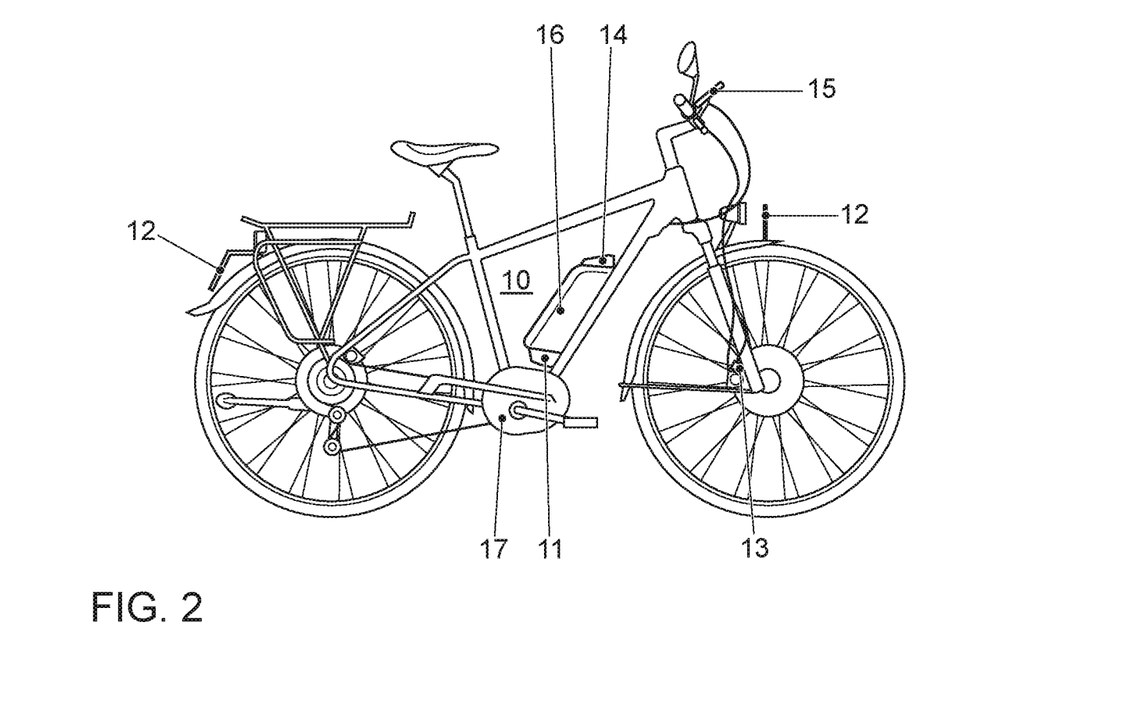
FIG. 2 shows a bicycle corresponding to a vulnerable road user transportation vehicle equipped with additional disclosed components.

FIG. 2 shows an example of a bicycle 10 which is enhanced with communication technology for the purpose of the proposal. The reference numbers shown in FIG. 2 denote an on-board communication unit 11, two antennas 12 one mounted at the rear end of the bike and the other at the front of the bicycle, a wheel tick unit WTU 13, a GPS module 15 and a battery 16. In the example shown in FIG. 2, the bicycle corresponds to an e-bike equipped with electric motor 17. The battery 16 therefore is rechargeable and the capacity of the battery 16 is big.

Figure 3:
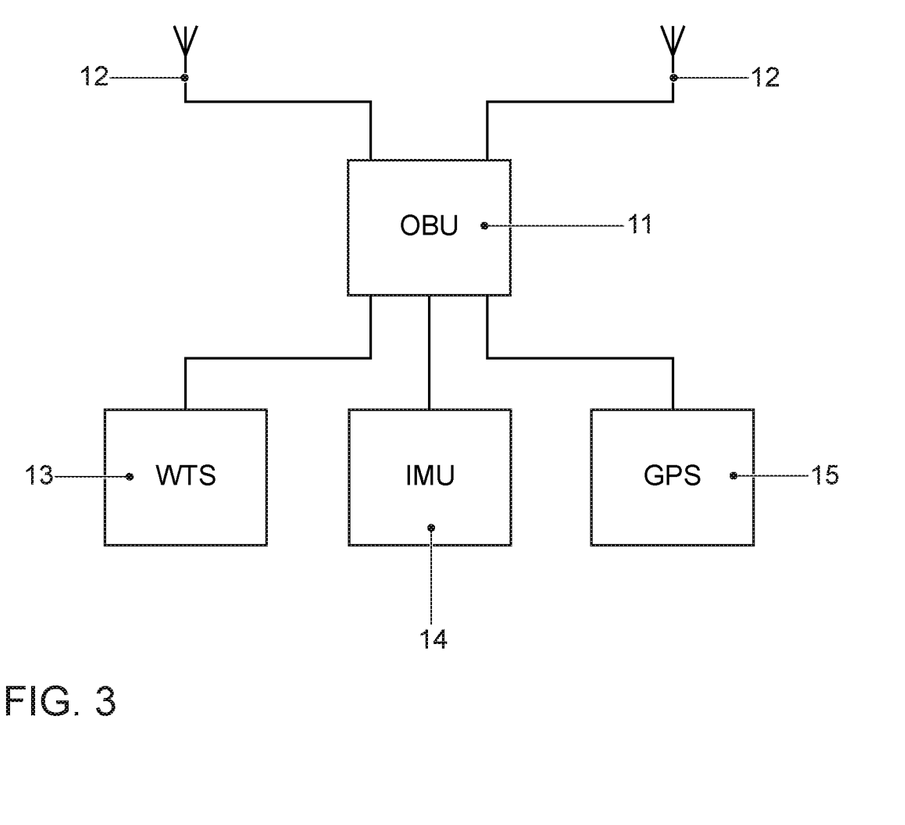
FIG. 3 shows a block diagram for the electronic components of a vulnerable road user transportation vehicle.

FIG. 3 now shows the block diagram of the communication system with which the bicycle 10 is equipped. Here, it is noted that the same components are labelled with the identical reference numbers which are also used in FIG. 2. The wheel tick sensor 13 just delivers information about the rotational movement of the bicycle wheels. This provides information about the distance the bicycle has moved starting from a reference point. An inertial measurement unit 14 works by detecting the acceleration using one or more accelerometers and rotational rate using one or more gyroscopes. For motorbikes there exist IMUs which are readily available and could also be used in bicycles. They basically measure acceleration in longitudinal and lateral direction, but also the lean angle of the bike is measured. There exist IMUs which measure 6 degrees of freedom. To further add precision a 3D compass to the IMU could be integrate to add another 3 degrees of freedom. This type of information is primarily used for the purpose of electronic traction control. The GPS module 15 delivers an absolute position with satellite navigation as explained above.

The on-board unit 11 is a communication module which comprises a WLAN module or an LTE modem as indicated above.

In the following it is assumed that the on-board unit 11 comprises an LTE modem. This LTE modem is compliant with the specification for direct vehicle-to-vehicle communication LTE-V as above mentioned. This sort of direct V2V communication makes use of the sidelink communication direction as specified in the various LTE specifications. The on-board unit 11 may also be equipped with a BLUETOOTH® communication protocol stack such that the module is capable to exchange messages with an associated BLUETOOTH® partner station.

Figure 4:
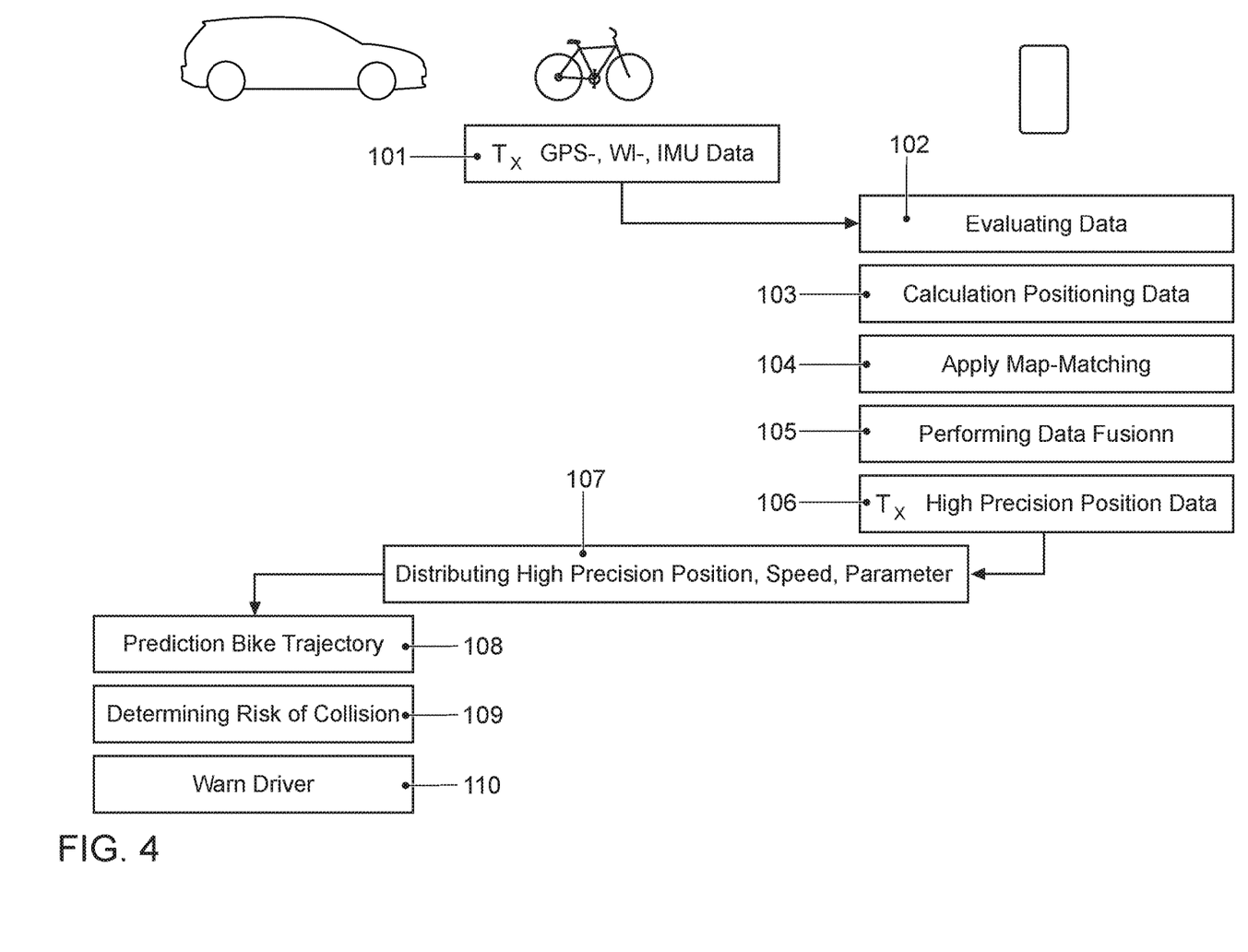
FIG. 4 illustrates the process for collision avoidance according to the disclosure.

The method for collision avoidance is now described with the help of FIG. 4.

At the beginning, the cyclist connects his mobile phone to the bicycle 10 via BLUETOOTH® communication. This corresponds to the well-known BLUETOOTH® association process. Bike and smartphone can communicate continuously. In the following we describe the collision avoidance procedure:

The bicycle measures a position using the GPS module 15. This task is better performed at the bicycle 10 than at the portable communication device, since the bicycle may be equipped with better antennas having a better direct visual connection to the sky than what is possible with the portable device. Several antennas 12 for the mobile communication can also be installed on the bicycle 10 for making use of an antenna diversity technique, in particular, reception diversity such as MISO technique corresponding to multiple input single output.

The bicycle 10 takes information about the movement of the wheels by the wheel-tick unit 13. This can only be done on the bicycle 10 with a sensor—this is not possible on the portable communication device. Moreover, the bicycle 10 receives information about the movement and orientation/inclination via the Inertial Measurement Unit (IMU) 14 and GPS data from the GPS module 15. The bicycle 10 transmits the recorded data to the portable communication device. All this happens in operation at 101 of FIG. 4.

The smart phone evaluates the position sensor data and calculates position data for the bicycle in operations at 102 and 103. The calculation is performed with the recorded raw data that had been collected in operation at 101. The way the smartphone calculates the bicycle position is basically a known process. E.g., smartphones and tablets are anyway capable to calculate the absolute position of the smartphone, since they are usually equipped with a navigation app, like "Google Maps", a trademark from Google Inc. The calculation of the position is carried out in operation at 103. Operations at 102 and 103 are optional and will be left out if the GPS module delivers completed position data on its own.

The portable device performs an operation of map matching in operation at 104 with the position data to improve the position quality. The map matching technique maps the measured position with the map information about the location and geometry of objects in the map so that the most likely position of the object is determined in the map. Also the map matching technique is used in conventional navigation systems, such that it is referred to such state of the art solutions for further details.

The different sensor systems, odometry with WTS and IMU sensor and GPS deliver different results for the bicycle position. Both position results are subject to errors. In operation at 105 then the technique of data fusion is applied on the different position data. This technique is capable of merging the different position results. With this technique the precision of the position determination is subjectively increased. Also the data fusion technique, sometimes also called "sensor fusion" is known in the state of the art. Applicant refers to the former application of the applicant with application number DE 10 2017 108 130.5 for further details about the data fusion technique.

The map matching technique requires that map data is updated frequently to perform this operation with high precision. The data fusion technique comprises a high demand of calculation expenditure. Therefore, these operations should be better performed on the portable device than on bicycle 10.

The finished position is sent back to the bicycle 10 in operation at 106.

The bike distributes information on the finished position (see above) and dimensions of the bicycle 10 to all road users in operation at 107. This is implemented using one of the possible communication technologies that allow direct communication with the environment (802.11p, LTE-V, future 5G D2D technology). The distribution of that information can be done significantly better than with the portable device: As above mentioned, it can be equipped with better antennas for the V2V, D2D or car2car direct communication. Furthermore, the continuous emission of signals also requires energy. This can be provided on the bicycle more easily than on the portable device.

The surrounding transportation vehicles which receive the bicycle 10 position information use it to calculate on their own the bicycle trajectory. The trajectory describes the bicycle movement in a certain time period which typically also comprises a time period in the future such that the transportation vehicle 20 has an estimate of where the bicycle 10 will go to be able to estimate the a risk of a collision. The bike trajectory is predicted in operation at 108 and the risk of a collision is calculated in operation at 110. If transportation vehicle 20 recognizes a certain risk of a collision, it outputs a warning message to the driver. An alternative embodiment of the solution is that the transportation vehicle automatically performs a collision avoidance maneuver without waiting for the reaction of the driver. Here, the transportation vehicle could perform a strong braking action or an emergency braking action to avoid a collision with the bicycle.

A good overview about different ways to calculate such collision avoiding maneuver is described in a thesis report of Dr. Thomas Maurer titled "Bewertung von Mess-und Pradiktionsunsicherheiten in der zeitlichen Eingriffsentscheidung für automatische Notbrems-und Ausweichsysteme" at University Duisburg-Essen. Another detailed example of such a system is described in the pending application of the applicant with the number K24686.

It is to be understood that the proposed method and apparatus may be implemented in various forms of hardware, software, firmware, special purpose processors, or a combination thereof. Special purpose processors may include application specific integrated circuits (ASICs), reduced instruction set computers (RISCs) and/or field programmable gate arrays (FPGAs). Optionally, the proposed method and apparatus is implemented as a combination of hardware and software. Moreover, the software may be implemented as an application program tangibly embodied on a program storage device. The application program may be uploaded to, and executed by, a machine comprising any suitable architecture. Optionally, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It should be understood that the elements shown in the figures may be implemented in various forms of hardware, software or combinations thereof. Optionally, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

It is to be further understood that, because some of the constituent system components and method operations depicted in the accompanying figures may be implemented in software, the actual connections between the system components (or the process operations) may differ depending upon the manner in which the proposed method and apparatus is programmed Given the teachings herein, one of ordinary skill in the related art will be able to contemplate these and similar implementations or configurations of the proposed method and apparatus.

The disclosure is not restricted to the exemplary embodiments described here. There is scope for many different adaptations and developments which are also considered to belong to the disclosure.

REFERENCE SIGN LIST

10 Bicycle
11 On-Board Unit
12 Antenna
13 Wheel Tick Sensor
14 IMU Module
15 GPS Module
16 Battery
20 Surrounding Transportation Vehicle
101 Operation Of Transferring Position Detecting Sensor Data
102 Operation Of Evaluating The Position Detecting Sensor Data
103 Operation Of Deriving Position Data
104 Operation Of Performing A Map Matching Technique
105 Operation Of Performing A Data Fusion Technique
106 Operation Of Transferring High Precision Position Data
107 Operation Of Distributing High Precision Position Data
108 Operation Of Calculating A Trajectory For The Vulnerable Road User Transportation Vehicle
109 Operation Of Determining a Risk of a Collision
110 Operation Of Warning The Driver Of The Surrounding Transportation Vehicle

The invention claimed is:

1. A method for collision avoidance between a vulnerable road user transportation vehicle and surrounding transportation vehicles, wherein the user of the vulnerable road user transportation vehicle makes use of a portable communication device, the method comprising:
transferring position detecting sensor data generated by at least two different position detecting sensors on the vulnerable road user transportation vehicle or position data derived therefrom to the portable communication device;
the portable communication device:
evaluating the position detecting sensor data;
deriving position data for the vulnerable road user transportation vehicle, wherein data fusion is performed in the portable communication device with the raw position data derived from the data generated by the at least two different position detecting sensors, and wherein the data fusion is performed on a central processing unit of the portable communication device;
performing a map matching technique on the central processing unit of the portable communication device, for refining the position data by matching an output of the data fusion to a location on a map based on the geometry of objects on that map;
transferring the refined position data to the vulnerable road user transportation vehicle; and
the vulnerable road user transportation vehicle, distributing the refined position data to the surrounding transportation vehicles thereby enabling determination of a risk of a collision.

2. A non-transitory computer readable medium including computer program instructions that perform a method when the computer program instructions are executed on a central processing unit included in a portable communication device, the method comprising:

evaluating sensor data containing position data received from a plurality of position detecting sensors on a vulnerable road user transportation vehicle;

deriving, from the evaluated sensor data, raw position data for a vulnerable road user transportation vehicle;

performing data fusion with the raw position data derived from the plurality of position detecting sensors;

performing a map matching technique for refining the position data by matching an output of the data fusion to a location on a map based on the geometry of objects on that map; and transferring the refined position data to the vulnerable road user transportation vehicle.

3. The method of claim 1, further comprising a surrounding transportation vehicle predicting a trajectory for the vulnerable road user transportation vehicle based on the position data received in the distribution operation, determining the risk of a collision and, in response to the risk of a collision exceeding a certain level, performing a collision avoidance maneuver and/or outputting a warning message to the driver of the surrounding transportation vehicle.

4. The method of claim 1, wherein transferring the position detecting sensor data is performed by a short range wireless communication technique.

5. A vulnerable road user transportation vehicle comprising:
at least two different position detecting sensors generating position detecting sensor data;
a portable communication module; and
an antenna module,
wherein the portable communication module is configured to enable a user of the vulnerable road user transportation vehicle to transfer position detecting sensor data generated by at least two different position detecting sensors on the vulnerable road user transportation vehicle or position data derived therefrom, wherein the position detecting sensor data is evaluated and position data for the vulnerable road user transportation vehicle is derived,
wherein data fusion is performed in the communication module with the raw position data derived from the data generated by the at least two different position detecting sensors, and wherein the data fusion is performed on a central processing unit of the portable communication module,
wherein a map matching technique on the central processing unit of the portable communication device, is performed for refining the position data by matching an output of the data fusion to a location on a map based on the geometry of objects on that map and the refined position data is transferred to the vulnerable road user transportation vehicle, and
wherein the vulnerable road user transportation vehicle distributes the refined position data to surrounding transportation vehicles thereby enabling determination of a risk of a collision.

6. The non-transitory computer readable medium of claim 2, wherein, in the method, the vulnerable road user transportation vehicle distributes the refined position data to the surrounding transportation vehicles thereby enabling prediction of a trajectory for the vulnerable road user transportation vehicle based on the refined position data to determine the risk of collision and, in response to the risk of a collision exceeding a certain level, perform a collision avoidance maneuver.

7. The vulnerable road user transportation vehicle of claim 5, wherein the transferring of the position detecting sensor data is performed by a short range wireless communication technique.

8. The vulnerable road user transportation vehicle of claim 5, wherein the antenna module comprises at least two antennas for applying an antenna diversity technique such as multiple input single output (MISO), single input multiple output (SIMO) or multiple input multiple output processing (MIMO).

9. The vulnerable road user transportation vehicle of claim 5, wherein the at least two position detection sensors comprise at least two of the sensors a wheel tick sensor (WTS), an inertial measurement unit (IMU), and an absolute positioning system module (GPS).

10. The vulnerable road user transportation vehicle of claim 5, wherein the communication module performs vehicle-to-vehicle communication (V2V) or device-to-device communication (D2D) according to one of the systems WLAN 802.11p, LTE-V or 5G D2D.

11. A surrounding transportation vehicle configured to perform collision avoidance operations between a vulnerable road user transportation vehicle and the surrounding transportation vehicle,
wherein data fusion is performed on a central processing unit of a portable communication device of the vulnerable user transportation vehicle, utilizing position data derived from raw position detecting sensor data generated by at least two different position detecting sensors on the vulnerable road user transportation vehicle,
wherein the refined position data is generated using a map matching technique for refining position data derived from the evaluation of position detecting sensor data generated by at least two different position detecting sensors on the vulnerable road user transportation vehicle, or position data derived therefrom,
wherein the surrounding transportation vehicle receives refined position data from the vulnerable road user transportation vehicle, and
wherein the surrounding transportation vehicle uses the refined position data to determine a risk of a collision.

12. The surrounding transportation vehicle of claim 11, wherein the surrounding transportation vehicle predicts a trajectory for the vulnerable road user transportation vehicle based on the received refined position data, determines the risk of collision and, in response to the risk of a collision exceeding a certain level, performs a collision avoidance maneuver and/or outputting a warning message to the driver of the surrounding transportation vehicle.

13. The vulnerable road user transportation vehicle of claim 5, wherein the vulnerable road user transportation vehicle distributes the refined position data to the surrounding transportation vehicles thereby enabling prediction of a trajectory for the vulnerable road user transportation vehicle based on the refined position data to determine the risk of collision and, in response to the risk of a collision exceeding a certain level, perform a collision avoidance maneuver.

* * * * *